(12) United States Patent
Dinc

(10) Patent No.: US 9,277,608 B2
(45) Date of Patent: Mar. 1, 2016

(54) CIRCUIT FOR OPERATING PARALLEL LIGHT EMITTING DIODE STRINGS

(75) Inventor: Mustafa Dinc, Heilbronn (DE)

(73) Assignee: Vishay Electronic GmbH, Selb (DE)

( * ) Notice: Subject to any disclaimer, the term of this patent is extended or adjusted under 35 U.S.C. 154(b) by 478 days.

(21) Appl. No.: 13/265,755

(22) PCT Filed: Apr. 21, 2010

(86) PCT No.: PCT/EP2010/002456
§ 371 (c)(1),
(2), (4) Date: Jan. 20, 2012

(87) PCT Pub. No.: WO2010/121806
PCT Pub. Date: Oct. 28, 2010

(65) Prior Publication Data
US 2012/0112647 A1    May 10, 2012

(30) Foreign Application Priority Data

Apr. 22, 2009 (DE) .......................... 10 2009 018 428

(51) Int. Cl.
*H05B 37/02* (2006.01)
*H05B 33/08* (2006.01)
*H05B 37/03* (2006.01)

(52) U.S. Cl.
CPC .......... *H05B 33/0815* (2013.01); *H05B 33/089* (2013.01); *H05B 33/0839* (2013.01); *H05B 33/0893* (2013.01); *H05B 37/034* (2013.01); *Y02B 20/347* (2013.01)

(58) Field of Classification Search
CPC ............. H05B 33/0881; H05B 33/089; H05B 33/0884; G01J 3/0264; B60Q 3/0293; B60Q 3/001
USPC .......................................................... 315/247
See application file for complete search history.

(56) References Cited

U.S. PATENT DOCUMENTS 3,963,351 A * 6/1976 Chance ................ G01N 21/314
250/227.23
6,285,139 B1 * 9/2001 Ghanem ....................... 315/291
(Continued)

FOREIGN PATENT DOCUMENTS

DE         100 25 821 A1   7/2002
DE    10 2004 034 359 B3   2/2006
(Continued)

OTHER PUBLICATIONS

ON Semiconductor 'Switchmode Power Supply Reference Manual', Rev. 3B, Jul. 2002.*
(Continued)

*Primary Examiner* — Alexander H Taningco
*Assistant Examiner* — Christine Johnson
(74) *Attorney, Agent, or Firm* — Volpe and Koenig, P.C.

(57) ABSTRACT

A circuit for operating a light-emitting diode assembly, wherein the light-emitting diode assembly comprises a plurality of strands connected in parallel of one or more light-emitting diodes which are arranged in series and through which in the operational state a particular partial current of an operating current flowing through the light-emitting diode assembly flows, comprises a current source for providing the operating current. The circuit is designed to detect the greatest partial current and to control an operational value provided by the partial current source on the basis of said greatest partial current such that none of the partial currents exceeds a predetermined maximum current.

15 Claims, 1 Drawing Sheet

(56) References Cited

U.S. PATENT DOCUMENTS

| | | | |
|---|---|---|---|
| 6,858,994 B2 | 2/2005 | Vollrath | |
| 7,042,165 B2 * | 5/2006 | Madhani | B60Q 1/30 315/185 R |
| 7,976,188 B2 | 7/2011 | Peng | |
| 2003/0210917 A1 * | 11/2003 | Stewart | H04B 10/6931 398/209 |
| 2004/0004178 A1 * | 1/2004 | Blasing | H05B 37/036 250/214 R |
| 2004/0207328 A1 * | 10/2004 | Ito | B60Q 11/005 315/77 |
| 2005/0057179 A1 * | 3/2005 | Madhani | B60Q 1/30 315/185 R |
| 2005/0073428 A1 * | 4/2005 | Sugimoto et al. | 340/815.45 |
| 2005/0104542 A1 | 5/2005 | Ito et al. | |
| 2005/0161586 A1 * | 7/2005 | Rains, Jr. | F21S 2/00 250/214.1 |
| 2005/0179393 A1 * | 8/2005 | Murakami et al. | 315/77 |
| 2005/0230704 A1 * | 10/2005 | Ohno | 257/113 |
| 2005/0242822 A1 * | 11/2005 | Klinger | B60Q 11/005 324/523 |
| 2006/0022607 A1 | 2/2006 | Hsu | |
| 2006/0044800 A1 * | 3/2006 | Reime | B60Q 3/001 362/276 |
| 2006/0082332 A1 * | 4/2006 | Ito et al. | 315/291 |
| 2006/0087843 A1 * | 4/2006 | Setomoto | H05B 33/0803 362/249.01 |
| 2006/0146553 A1 * | 7/2006 | Zeng | B60Q 3/001 362/488 |
| 2007/0013321 A1 * | 1/2007 | Ito et al. | 315/247 |
| 2007/0096746 A1 * | 5/2007 | Telefont | 324/500 |
| 2007/0132602 A1 * | 6/2007 | Ito et al. | 340/641 |
| 2007/0159750 A1 * | 7/2007 | Peker et al. | 361/93.1 |
| 2007/0195025 A1 * | 8/2007 | Korcharz | H05B 33/0893 345/82 |
| 2007/0210722 A1 * | 9/2007 | Konno et al. | 315/185 S |
| 2008/0143266 A1 * | 6/2008 | Langer | H05B 33/0818 315/185 R |
| 2008/0164828 A1 * | 7/2008 | Szczeszynski et al. | 315/300 |
| 2009/0026977 A1 * | 1/2009 | Omi | H02M 1/36 315/294 |
| 2009/0051301 A1 | 2/2009 | Garufo | |
| 2010/0148683 A1 | 6/2010 | Zimmermann et al. | |

FOREIGN PATENT DOCUMENTS

| | | |
|---|---|---|
| DE | 10 2006 005 521 B3 | 5/2007 |
| DE | 10 2006 000 810 A1 | 7/2007 |
| DE | 20 2008 006 328 U1 | 8/2008 |
| DE | 10 2007 031 038 A1 | 1/2009 |
| DE | 10 2004 032 456 B3 | 10/2011 |
| EP | 1 079 667 A2 | 2/2001 |
| GB | 2 434 929 A | 8/2007 |
| JP | 2005-109025 A | 4/2005 |
| WO | 2007023454 A1 | 3/2007 |
| WO | WO2007023454 * | 3/2007 ............ H05B 33/08 |
| WO | 2007096868 A1 | 8/2007 |
| WO | WO2007096868 * | 8/2007 ............ H05B 33/08 |

OTHER PUBLICATIONS

German Search Report dated Feb. 2, 2010 from priority application 102009018428.7.

International Search Report dated Jul. 23, 2010 from priority application PCT/EP2010/002456.

* cited by examiner

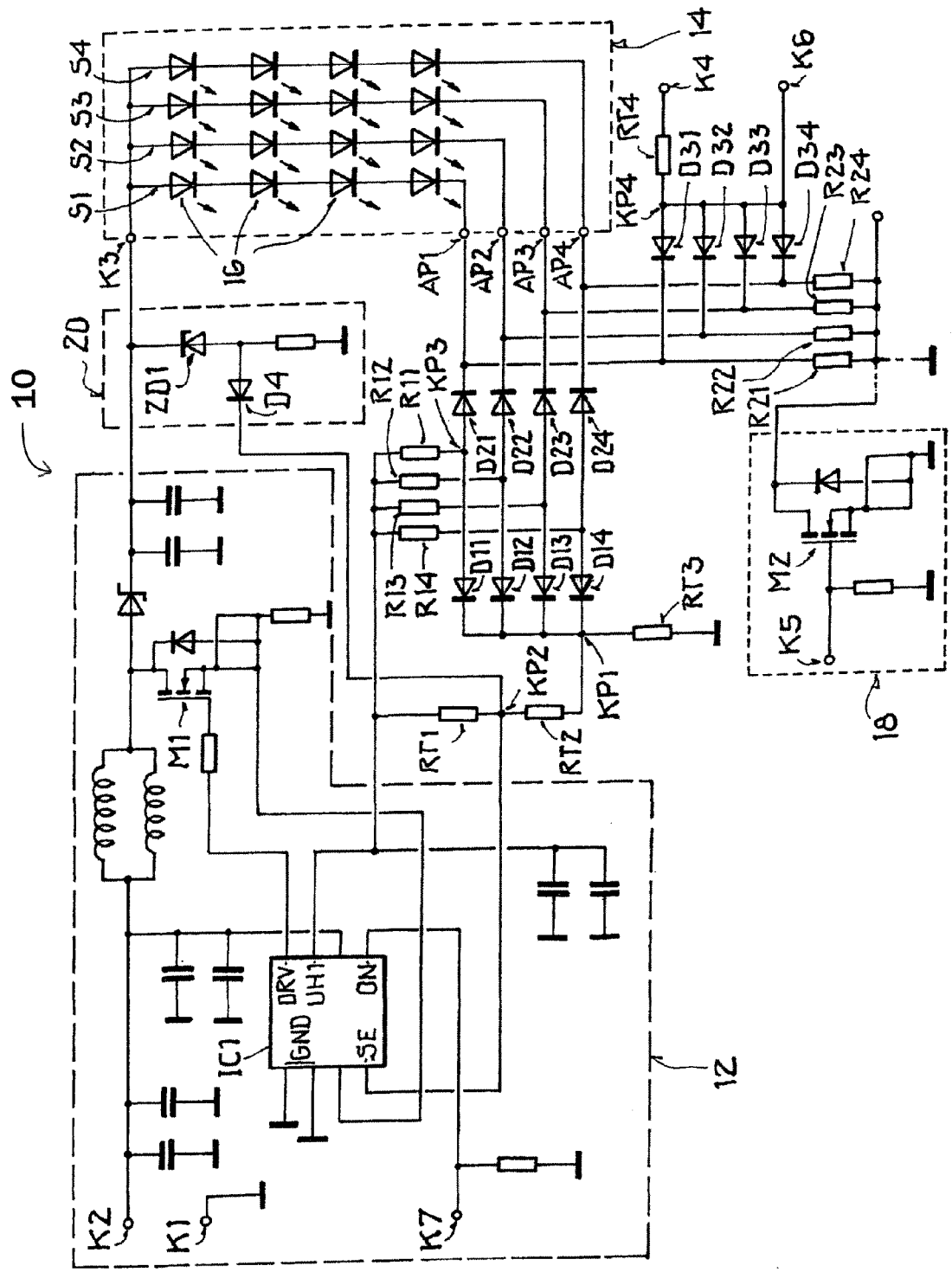

CIRCUIT FOR OPERATING PARALLEL LIGHT EMITTING DIODE STRINGS

The invention relates to a circuit for operating a light emitting diode arrangement, wherein the light emitting diode arrangement has a plurality of strings connected in parallel of one or more light emitting diodes arranged in series through which a respective partial current of an operating current flowing through the light emitting diode arrangement flows in the operating state.

Advances in the development of light emitting diodes, in particular with white high performance light emitting diodes, also make them increasingly interesting for use in lamps, in particular street lamps, or for other illumination purposes, for example as backlight for LCD displays or TFT displays. A plurality of light emitting diodes are combined to a specific light emitting diode arrangement to achieve a sufficient intensity of illumination in dependence on the application. To achieve a simplified circuit design and so that the operating voltages and operating currents required for an operation of the light emitting diode arrangement have a suitable ratio with respect to one another, the light emitting diodes are arranged in a plurality of parallel strings which each include one or more light emitting diodes connected in series.

As a rule, a constant current source is provided which provides the total operating current flowing through the light emitting diode arrangement, with a regulation or restriction of the summation current flowing through all strings being able to be provided. If the operating parameters of the light emitting diode, for example the forward bias or the permitted maximum current, are within a tight tolerance range and if any temperature differences between different light emitting diodes are small due to a suitable arrangement of the light emitting diodes, the total current will be distributed evenly over the individual strings.

A problem occurs, however, if defects occur in individual light emitting diodes. Such defects have the consequence in the much greater part of cases that the internal resistance of the light emitting diode becomes very high or an interruption of the electric current in the light emitting diode occurs since a fusing of a bonding wire is as a rule responsible for a light emitting diode failure. This has the result that only a very small current or no current at all still flows in the respective string so that the total current is distributed over the remaining strings in a parallel circuit and has the consequence of an increase of the part currents flowing through the individual strings. Since the light emitting diodes are as a rule operated approximately at the permitted maximum current to achieve the largest possible brightness, every further increase in the part flows effects an overload of the light emitting diodes in the remaining strings so that there is a power drop and ultimately a total failure of the light emitting diode arrangement within a very short time.

Such a chain reaction can be avoided if further means for current regulation or current limitation are provided, such as EP 1 079 667 A2 discloses, in addition to a regulation of the total current in every individual string. Such a solution, however, causes higher manufacturing and operating costs since, on the one hand, the circuit effort becomes substantially larger and, on the other hand, the power losses increase due to the additional linear regulator, which results in a reduction in the total efficiency.

It is therefore the object of the invention to provide a simple and inexpensive circuit for operating a light emitting diode arrangement with a plurality of strings connected in parallel of a respective one or more light emitting diodes arranged in series which also allows a reliable further operation of the light emitting diode arrangement on a defect of a light emitting diode.

The object is satisfied by the features of a circuit for operating a light emitting diode arrangement in accordance with the invention, wherein the light emitting diode arrangement has a plurality of strings arranged in parallel of one or more light emitting diodes arranged in series through which a respective part current of an operating current flowing through the light emitting diode arrangement flows in the operating state. The circuit includes a current source for providing the operating current and is characterized in that the circuit is designed to recognize the largest part current and to regulate an operating value provided by the current source on the basis of this largest part flow so that none of the part flows exceeds a predefined maximum current.

The operating value provided by the current source, for example an operating current or an operating voltage, is therefore limited so much that no part current exceeds a predefined limit value.

If, for example, due to a defect or a failure of a light emitting diode in a specific string, an interruption of this string occurs, the respective part current in this string becomes equal to zero. This part current is distributed over the remaining strings due to the parallel connection of the strings so that an increase in the remaining part currents would occur without corresponding measures. The circuit in accordance with the invention acts against this, however, in that it lowers the operating value provided by the current source so much that all part currents in the remaining strings are smaller than or equal to the predefined maximum current.

The circuit therefore compensates in a reliable manner the failure of one or more light emitting diodes so that a failure of the total light emitting diode arrangement or thermal damage to the remaining light emitting diodes by excess current is avoided.

It is to be mentioned that not only the failure of a single string can be compensated by the circuit, but also the remaining strings are reliably protected against an overload and any failure of further light emitting diodes associated therewith on an interruption of a plurality of strings. A shortening of the service life of the intact light emitting diodes is thereby avoided so that after a failure of individual light emitting diodes only these light emitting diodes have to be replaced. Except for a replacement of the defective light emitting diodes, the light emitting diode arrangement can be further operated without problem without having to fear any overload-induced failure of further light emitting diodes or even a total failure of the total arrangement.

The number of the strings to be operated in parallel by means of the circuit in accordance with the invention may generally be as desired and is only limited by the performance capability of the current source. The same applies to the number of light emitting diodes per string. It should, however, be noted with respect to ideal operating relationships that the light emitting diodes are selected so that all light emitting diodes in the arrangement have comparable characteristics, e.g. with respect to the temperature dependence of the forward bias, so that the part flows in the individual strings do not substantially differ from one another under normal operating conditions. This also ensures that all light emitting diodes illuminate with approximately the same brightness.

The circuit in accordance with the invention further allows the light emitting diode arrangement to be operated with a maximum permitted current for the light emitting diode type used. The necessity of operating the individual strings with a current reduced by a corresponding safety margin to compensate for any failure of an individual string is thus dispensed with.

In accordance with a preferred embodiment of the invention, the circuit is designed to deliver a control voltage to the current source, with the operating value being able to be regulated on the basis of the level of the control voltage. Common current sources can thus be used which expect a voltage as a control parameter at their regulation input.

In accordance with a further preferred embodiment of the invention, the circuit has an arrangement for providing the control voltage which includes a plurality of first diodes whose cathodes are mutually connected to a control voltage reference node and a plurality of second diodes, with the respective cathode of every second diode being connected at a string terminal to a string and a plurality of first resistors which are connected at their first terminal to a first auxiliary voltage source and at their second terminal to the anode of a respective first diode of the anode of the anode of a respective diode so that the potential at the control voltage reference node is dependent on the string terminal points.

It is therefore possible by means of this arrangement to set the potential at the control voltage reference node such that it is always a measure for the potential of that string at its string terminal point in which the highest part current flows.

The arrangement for the provision of the control voltage preferably further includes a voltage divider series circuit having a first, a second and a third voltage divider resistor, wherein a first terminal of the voltage divider series circuit associated with the first voltage divider resistor is connected to the first auxiliary voltage source and a second terminal of the voltage control series circuit associated with the third voltage divider resistor is connected to a reference potential, wherein the connection between the second and the third voltage divider resistors is connected to the cathodes of the first diodes and thus forms the named control voltage reference node, and wherein the control voltage is provided at the connection between the first and the second voltage divider resistors. A control voltage suitable for controlling the current source can thereby be generated from the potential in the control voltage reference node.

The connection between the first and the second voltage divider resistors can preferably be connected to the output of an excess voltage protection circuit which is designed to deliver an excess voltage signal on the basis of which the operating value provided by the current source is reduced when an operating voltage applied to the input of the excess voltage circuit exceeds a predefined maximum value. A limitation of the output voltage generated by the current source is thus realized for the additional securing of the light emitting diode arrangement against excess currents.

In accordance with a further preferred embodiment, the arrangement for the provision of the control voltage further includes a plurality of second resistors which are connected at their first terminal to a reference potential and at their second terminal to a respective string terminal point. These resistors serve for the generation of a specific potential at the string terminal points in dependence on the part currents on the basis of which ultimately a corresponding control voltage is provided.

In a further advantageous embodiment, the circuit includes recognition means for recognizing a substantial increase in the electric resistance or an interruption in a string. It is possible by this recognition means to recognize the failure of light emitting diodes in one or more strings.

The recognition means advantageously include a plurality of third diodes of which each is connected at tis cathode to the second terminal of one of the second resistors and at its anode via a fourth voltage divider resistor to a second auxiliary voltage source, wherein a terminal at which a recognition signal is supplied is provided at the connection between the anodes of the third diodes and the fourth voltage divider resistor. This recognition signal is output when a potential change occurs at the node formed between the second terminal of one of the second resistors and at the cathode of a third diode on the basis of the increase in the electric resistance or of an interruption in a string of the light emitting diode arrangement.

The current source preferably includes a switching regulator, in particular a step-up converter. Step-up converters provide an operating voltage which is higher than the input voltage of the step-up converter so that light emitting diode arrangements can also be operated with simple means in which the sum of the forward biases of the light emitting diodes arranged in series is higher than the input voltage available for the circuit. The circuit can thus be used, for example, in conjunction with solar power generators which as a rule provide a DC voltage of 12 V.

The current source advantageously includes means for the clocked control of the switching regulator. By the selection of a suitable clock frequency and/or of a suitable mark space ratio, the operating value of the current source can thereby be changed.

In accordance with a preferred embodiment of the invention, the circuit has dimming means for dimming the light emitting diode arrangement.

The dimming means can e.g. include a pulse width modulation by which the operating current is clocked at a specific frequency. The frequency of the interruptions is in this respect selected so that the human eye no longer perceives it as a flickering. The mark space ratio, i.e. the ratio of switch-on time to switch-off time, in this respect determines the brightness of the light radiated by the light emitting diode arrangement. A largely loss-free dimming of the light emitting diode arrangement is possible by a pulse width modulation of the operating current.

The dimming means can preferably be provided between the first terminals of the second resistors and the reference potential.

It is preferred if the circuit has an interface module for data communication which is designed for providing a defect signal on the basis of the recognition of a substantial increase in the resistance or of an interruption in a string. The interface module makes it possible to report a failure of a string of the light emitting diode arrangement by means of wireless or wired communication. If a plurality of circuits in accordance with the invention are combined to one operating unit, for example in the case of street lighting in which a large number of lamps have to be monitored, it is possible quickly to identify a defective lamp if this defect signal includes address data which allow an identification of the defective lamp. The necessity to check the function of the lamps at regular intervals by visual inspection is dispensed with.

In accordance with a preferred embodiment, the interface module is designed to generate the defect signal on the basis of a reduction of the voltage provided at the anodes of the third diodes.

In accordance with a further preferred embodiment of the invention, a light emitting diode module includes a light emitting diode arrangement having a plurality of strings connected in parallel of one or more light emitting diodes arranged in series and a circuit for operating the light emitting diode arrangement in accordance with the present invention.

It is generally also possible also to combine two or more circuits in accordance with the invention with a respective light emitting diode arrangement in one light emitting diode module, wherein all circuits of the light emitting diode module are connected to a signal interface module. This common interface module consequently has a plurality of inputs via which a respective circuit in accordance with the invention can be monitored. In this respect, the output defect signal can include data as to which of the monitored circuits actually has a defect.

The invention will be described in the following with reference to embodiments and to the drawing. It shows in accordance with FIG. 1 a circuit diagram of a circuit in accordance with the invention or of a light emitting diode module in accordance with the invention.

A circuit 10 in accordance with the invention includes a current source 12 which is known per se, is designed as a step-up converter and includes an arrangement of a plurality of inductances and capacitances, a Schottky diode S1 and a MOS transistor M1. A driver IC IC1 is furthermore provided which is connected at its driver output DRV to the MOS transistor M1. It is clocked by the driver IC ICI in order ultimately to convert an input voltage applied to input terminals K!, K2 of the current source 12 into an operating voltage which is provided between an output terminal K3 and a reference potential, i.e. a common ground.

The driver IC IC1 is connected at its ground outputs GND to the reference potential and has a control input SE. The level of the operating voltage provided by the current source 12 in this respect depends on the level of a control voltage applied at the control input SE. If, for example, an IC of the Elmos E910.26 type is used as the driver IC IC1, a control voltage <1.22 V results in an increase of the operating voltage, whereas a control Voltage >1.22 V results in a reduction of the operating voltage.

The driver IC IC1 further provides a first auxiliary voltage source at an auxiliary voltage output UH1. The level of the auxiliary voltage amounts to 5 V in the case of the Elmos E910.26.

A light emitting diode arrangement 14 includes four strings S1 to S4 connected in parallel of a respective four light emitting diodes 16 arranged in series, wherein the terminals of the strings S1 to S4 at the anode side are connected to one another and to the output K3 of the current source 12 and a respective terminal of a string S1 to S4 at the cathode side is connected to a respective string terminal point AP1 to AP4 of the circuit 10.

It is understood that both the number of light emitting diodes 16 per string S1 to S4 and the number of strings S1 to S4 are only exemplary. Light emitting diode arrangements can be connected to the circuit 10 in accordance with the invention, with both the number of light emitting diodes per stand and the number of strings being larger or smaller than four in said light emitting diode arrangements.

The circuit 10 has four first diodes D11 to D14 whose cathodes are connected to one another at a control voltage reference node KP1. Furthermore, four second diodes D21 to D24 are provided whose respective cathode is connected to a respective string terminal point AP1 to AP4. Four first resistors R11 to R14 are connected at their first terminal to the auxiliary voltage output UH1 of the driver ICs IC1. A respective second terminal of the resistors R11 to R14 is connected to the anode of a respective first diode D11 to D14 and to the anode of a respective second diode D21 to D24.

Four second resistors R21 to R24 are connected to one another at their first terminal, whereas the second terminal of a respective second resistor R21 to R24 is connected to a respective string terminal point AP1 to AP4.

In a first variant, the mutually connected first terminals of the second resistors R21 to R24 are directly connected to the reference potential.

In a second variant, the mutually connected first terminals of the second resistors R21 to R24 are connected to a dimming circuit 18 which selectively connects the second terminals of the resistors R21 to R24 to the reference potential by means of an MOS transistor M2 in dependence on a clocked control signal applied to an input K5 of the dimming circuit 18. The dimming circuit 18 works according to the principle of pulse width modulation, i.e. the ratio of switch-on time to switch-off time of the MOS transistor M2 determines the brightness of the light radiated by the light emitting diode arrangement 14.

Four third diodes D31 to D34 are provided as means for a defect recognition of a failure of a string, of which each is connected at its cathode to the second terminal of one of the second resistors R21 to R24 and at its anode via a fourth voltage divider resistor RT4 to a second auxiliary voltage source connected to a terminal K4. The second pole of the second auxiliary voltage is connected to the reference potential. The circuit 10 can, however, generally also be designed without the above named means for defect recognition.

A first voltage divider resistor RT1 of a voltage divider series circuit is connected at its one terminal to the auxiliary voltage output UH1 or to the first terminals of the four first resistors R11 to R14 and at its other terminal to a control voltage node KP2. This control voltage node KP2 is in turn connected to the control input of the driver ICs IC1 as well as to the one terminal of a second voltage divider resistor RT2. The other terminal of the voltage divider resistor RT2 is connected to the control voltage reference node KP1. A third voltage control resistor RT3 is likewise connected at its one terminal to the control voltage reference node KP1 and at its other terminal to the reference potential.

The control voltage KP2 can additionally be connected to the output of an excess voltage protection circuit 20 which has a Zener diode ZD1. The Zener diode ZD1 is connected to the operating voltage generated by the current source 12 and via a resistor to the reference potential. On an exceeding of the breakdown voltage of the Zener diode ZD1, an increase in the control voltage takes place at the control voltage node KP2 so that the driver IC IC1 further reduces the operating voltage generated by the current source 12 until the Zener diode ZD1 blocks again.

Four third diodes D31 to D34 are provided as means for a defect recognition of a failure of a string, of which each is connected at its cathode to the second terminal of one of the second resistors R21 to R24 and at its anode via a fourth voltage divider resistor RT4 to a second auxiliary voltage source connected to a terminal K4. The second pole of the second auxiliary voltage is connected to the reference potential. The circuit 10 can, however, generally also be designed without the above named means for defect recognition.

It must additionally be noted that the last digit of the reference numerals for the first, second and third diodes D11 to D14, D21 to D24, D31 to D34 and the first and second resistors R11 to R14, R21 to R24 corresponds to the digits of the reference numerals of those strings S1 to S4 and string terminal points AP1 to AP4 with which the respective diodes or resistors are associated.

The function of the circuit 10 will be described in the following with respect to the regulation of the operating value of the current source 12. Where in the following the expression "potential" is used with respect to a specific point in the circuit 10 and nothing more detailed is specified, the expression "potential" relates to a potential or to a voltage between this point and the reference potential.

In the following, the currents flowing through the string Si and through the resistors R11 and R21 and diodes D11 and D21 associated with this string S1 will be looked at by way of example. A part flow which results in a specific potential at the string terminal point AP1 flows through the string S1 and through the resistor R21. Furthermore, a small current flows from the auxiliary voltage output UH1 through the voltage divider resistors RT1, RT2 and RT3 of the voltage divider series circuit, whereby a specific potential is likewise adopted at the control voltage reference node KP1. The diode pair comprising the diodes D11 and D21 ensures that the potentials at the string terminal point AP1 and at the string voltage reference node KP! are the same.

If now an increase in the part flow flowing through the string S1 occurs, for example due to an interruption in one of the other strings S2 to S4 which results in a distribution of the respective part flow over the non-interrupted strings, the potential consequently also increases in a node KP3 at which the diodes D11 and D21 as well as the resistor R12 are connected. The current flow through the first diode D11 increases due to this potential rise at the node KP3, which in turn results in a potential increase at the control voltage reference node KP1. A voltage increase at the control voltage node KP2 is also associated with this potential increase at the control voltage reference node KP1, i.e. the voltage applied at the control input SE increases.

This increase in the control voltage has the result that the current source 12 reduces its reference value, i.e. its output voltage, so much that the current falls in the light emitting diode arrangement 14 and in particular in the string S1. The voltages at the nodes KP3, KP1 and KP2 thereby also fall so long until the control voltage at the control input SE has reached its desired value. The regulation described above in each case also applies to the remaining strings S2 to S4.

However, only the string with the highest part flow is decisive for the potential at the control voltage reference node KP1. Only the diode of the first diodes D11 to D14 which is associated with this string is conductive. A voltage which is lower viewed in the direction of flow is applied to the remaining diodes so that they therefore are less conductive or not conductive at all. Consequently, only the highest of the potentials present at the string terminal points AP1 to AP4 is decisive for the level of the control voltage.

If a failure of one of the strings S1 to S4 occurs in the operation of the circuit, the current of the remaining three strings would increase by a third. The circuit 10 recognizes too high a voltage drop at one of the second resistors R21 to R24 on the string with the highest part flow and regulates the operating voltage provided by the current source 12 at the output K3 so far down until the defined maximum part flow per string again flows through the dimension of the circuit.

In the following, the defect recognition will now be described with which a substantial increase of the resistance or of an interruption in one of the strings S1 to S4 can be recognized.

Only the string S1 should first again be looked at. In this string S1, a specific part flow flows across the resistor R21 so that the associated string terminal point AP1 is at a specific potential. Furthermore, a specific current flows from the second auxiliary voltage source connected to the terminal K4 through the voltage divider resistor RT4, the third diode D31 and the resistor R21. A node KP4, which is between the anode of the diode D31 and the voltage divider resistor RT4, is consequently at a slightly higher potential than the string terminal point AP1.

If now due to the failure of one of the light emitting diodes 16 in the string S1 there is an increase in the electric resistance or a current interruption in this string S1, the potential in the string terminal point AP1 and thus at the cathode of the diode D31 is reduced. The potential on the anode side of the diode 31, i.e. at the terminal point KP4, is thereby also reduced. This voltage failure can be detected at a terminal K6 which is connected to the node KP4. It is always the lowest of the potentials present at the string terminal points AP1 to AP4 which is decisive for the potential at the terminal K6.

Finally, the function of the circuit will be explained in the following for the following exemplary resistance values:

R11 to R14: each 5.6 k$\Omega$,
R21 to R24: each 1.5 k$\Omega$,
RT1: 22 k$\Omega$,
RT2: 4 k$\Omega$,
RT3: 1 k$\Omega$,
RT4: 14 k$\Omega$,
Part current in the string S1: 350 mA,
Desired value of the control voltage: 1.22 V,
Voltage at the auxiliary voltage output UH1: 5 V,
Auxiliary voltage at the terminal K4: 5 V.

First, the circuit part will be explained which relates to the regulation:

With a current flow of 350 mA in string S1, such as is characteristic for a white high performance light emitting diode, a voltage of 0.525 V is measured at the string terminal point A'P1. A current of 172 mA $$\left(=\frac{5\text{ V}-1.22\text{ V}}{22\text{ k}\Omega}\right)$$

flows through the voltage divider resistor RT1. This current flows across the voltage divider resistors RT2 and RT3 since the diode D4 of the excess voltage protector circuit is connected in the blocking direction. The voltage at the voltage divider reference node KP! is almost at the same level as at the string terminal point AP1 due to the diode pair D11/D21 at 0.53 V (=1.22 V−172 mA·4 k$\Omega$). For if an increase in the potential at the string terminal point AP1 occurs due to a current increase in string S1, a lower current flows across the diode D21, but in turn a higher current across the diode D11, which results in a potential increase at the voltage divider reference node KP1 and consequently in the increase of the control voltage at the control input SE.

The circuit part will be explained in the following which relates to the defect recognition:

As has already been mentioned, at a current of 350 mA a voltage of 0.525 V is applied in string S1 at the string terminal point AP1 and thus at the cathode of the diode D31. Due to the forward bias of the diode D31, this voltage increases at the anode side by the forward bias of the diode so that a value of approximately 0.643 V is adopted at the terminal K6 in practice.

On an interruption or on a substantial increase in the resistance in string S1, the potential at the string terminal point AP1, and thus at the cathode of the diode D31, is reduced, theoretically to approximately 0 V. In practice, a voltage of approximately 0.317 V results at the terminal K6.

It must be noted to explain the measured values that the current flowing through the voltage divider resistor RT4 is distributed over all four diodes D31 to D34 if none of the strings S1 to S4 is interrupted. The forward biases of the diodes D31 to D34 will be slightly lower in this case than in the case of an interruption of the string S1 at which the total current flowing through the voltage divider resistor RT4 only flows through the one diode D31. In addition, leakage currents through the remaining three diodes D32 to D24 now connected in the blocking direction additionally result in a specific potential elevation.

The named voltage differences nevertheless allow a reliable detection. In the present example, 0.5 V would be selected as the threshold value, for example.

An interface module for data communication, not shown, can be connected to the terminal K6 and can output a corresponding defect signal on the recognition of a reduction in the potential at the terminal K6. The data communication can take place wirelessly or wired, for example via a control line, a radio connection, a WLAN network or an IP connection. The interface module can additionally also be made so that a monitoring of the input voltage of the current source can take place.

The interface module can furthermore also take over the control of the dimming circuit 18.

Finally, the driver IC IC1 has a switching input ON which is connected to a terminal K7 via which in turn a connection with the interface module can be established. An activation or deactivation of the current source 12 is possible via this switching input after the reception of corresponding commands so that the light emitting diode arrangement 14 can thus be deactivated without separating the connection for the input voltage.

For example, a microcontroller can be used on the interface module which has both at least one digital input and at least one A/D converter input. The interface module therefore ultimately represents a universal interface to the outside world via which both a monitoring and a control of the light emitting diode is possible.

The present circuit can be used, for example, with light emitting diode illumination bodies for external and internal lamps, for light emitting diode backlighting, for LCD or TFT monitors or for display boards and displays with a light emitting diode matrix.

REFERENCE NUMERAL LIST 10 circuit
12 current source
14 light emitting diode arrangement
16 light emitting diode
18 dimming circuit
20 excess voltage protection circuit
AP1-AP4 string terminal point
D11-D14 first diode
D21-D24 second diode
D31-D34 third diode
D4 diode
DRV driver output
GND ground output
IC1 driver IC
K1, K2 input of the current source
K3 output of the current source
K4, K6, K7 terminal
K5 input
KP1 control voltage reference node
KP2 control voltage node
KP3, KP4 node
M1, M2 MOS transistor
ON switching input
R11-R14 first resistor
R21-R24 second resistor
RT1-RT4 voltage divider resistor
S1-S4 string
SD1 Schottky diode
SE control input
UH1 auxiliary voltage output
ZD1 Zener diode

The invention claimed is:

1. A circuit (10) configured to operate a light emitting diode arrangement (14) comprising a plurality of parallel strings (S1-S4) of one or more light emitting diodes (16) arranged in series, the circuit (10) comprising:
a current source (12) configured to receive an input voltage and to provide an operating current to the parallel strings (S1-S4);
wherein the circuit (10) is configured to regulate the operating current provided by the current source (12);
wherein the circuit (10) is further configured to deliver a control voltage to the current source (12), and wherein the current source (12) is further configured to provide the operating current to the parallel strings (S1-S4) based on the control voltage; and
wherein the circuit (10) further comprises a sub-circuit configured to generate the control voltage, the sub-circuit comprising:
a plurality of first diodes (D11-D14) each comprising a cathode and an anode, wherein the cathodes of the first diodes are connected to one another at a first control voltage reference node (KP1);
a plurality of second diodes (D21-D24) each comprising a cathode and an anode, wherein each cathode of the second diodes (D21-D24) is connected to a respective one of the parallel strings (S1-S4); and
a plurality of first resistors (R11-R14) each comprising a first terminal and a second terminal, wherein the first resistors (R11-R14) are connected at their first terminal to a voltage source (UH1), and wherein each of the first resistors (R11-R14) is connected at its second terminal to the anode of a respective one of the first diodes (D11-D14) and to the anode of a respective one of the second diodes (D21-D24),
wherein the control voltage is generated from a potential in the first control voltage reference node (KP1).

2. The circuit (10) of claim 1, wherein the sub-circuit configured to generate the control voltage further comprises a voltage divider series circuit comprising a first, a second and a third voltage divider resistor (RT1, RT2, RT3), wherein a connection between the second and the third voltage divider resistors (RT2, RT3) is connected to the cathodes of the first diodes (D11-D14) at the first control voltage reference node (KP1); and wherein the sub-circuit configured to generate the control voltage provides the control voltage at a second control voltage reference node (KP2) between the first and the second voltage divider resistors (RT1, RT2).

3. The circuit (10) of claim 1, wherein the current source (12) includes a switching regulator.

4. The circuit (10) of claim 3, wherein the current source (12) is configured to control the switching regulator.

5. The circuit (10) of claim 1 further comprising an excess voltage protection circuit (20) configured to limit an operating voltage.

6. The circuit (10) of claim 1 further comprising a dimming circuit (18) configured to receive a control signal and dim the light emitting diode arrangement (14) based on the received control signal.

7. The circuit (10) of claim 6, wherein the dimming circuit (18) is configured to perform a pulse width modulation of the operating current.

8. A circuit (10) configured to operate a light emitting diode arrangement (14) comprising a plurality of parallel strings (S1-S4) of one or more light emitting diodes (16) arranged in series, the circuit (10) comprising:
- a current source (12) configured to receive an input voltage and to provide an operating current to the parallel strings (S1-S4);
- wherein the circuit (10) is configured to regulate the operating current provided by the current source (12);
- wherein the circuit (10) is further configured to deliver a control voltage to the current source (12), and wherein the current source (12) is further configured to provide the operating current to the parallel strings (S1-S4) based on the control voltage; and
- wherein the circuit (10) further comprises a sub-circuit configured to generate the control voltage, the sub-circuit comprising:
- a plurality of first diodes (D11-D14) each comprising a cathode and an anode, wherein the cathodes of the first diodes are connected to one another;
- a plurality of second diodes (D21-D24) each comprising a cathode and an anode, wherein each cathode of the second diodes (D21-D24) is connected to a respective one of the parallel strings (S1-S4);
- a plurality of first resistors (R11-R14) each comprising a first terminal and a second terminal, wherein the first resistors (R11-R14) are connected at their first terminal to a voltage source (UH1), and wherein each of the first resistors (R11-R14) is connected at its second terminal to the anode of a respective one of the first diodes (D11-D14) and to the anode of a respective one of the second diodes (D21-D24);
- a plurality of second resistors (R21-R24) each comprising a first terminal and a second terminal, wherein the second resistors (R21-R24) are connected at their first terminal to a reference potential, and wherein each of the plurality of second resistors (R21-R24) is connected at its second terminal to a respective one of the parallel strings (S1-S4); and
- a plurality of third diodes (D31-D34) each comprising a cathode and an anode, wherein each of the third diodes (D31-D34) is connected at its cathode to the second terminal of a respective one of the plurality of second resistors (R21-R24).

9. A circuit (10) configured to operate a light emitting diode arrangement (14) comprising a plurality of parallel strings (S1-S4) of one or more light emitting diodes (16) arranged in series, the circuit (10) comprising:
- a current source (12) configured to receive an input voltage and to provide an operating current to the parallel strings (S1-S4);
- wherein the circuit (10) is configured to regulate the operating current provided by the current source (12);
- wherein the circuit (10) is further configured to deliver a control voltage to the current source (12), and wherein the current source (12) is further configured to provide the operating current to the parallel strings (S1-S4) based on the control voltage; and
- wherein the circuit (10) further comprises a sub-circuit configured to generate the control voltage, the sub-circuit comprising:
- a plurality of first diodes (D11-D14) each comprising a cathode and an anode, wherein the cathodes of the first diodes are connected to one another;
- a plurality of second diodes (D21-D24) each comprising a cathode and an anode, wherein each cathode of the second diodes (D21-D24) is connected to a respective one of the parallel strings (S1-S4);
- a plurality of first resistors (R11-R14) each comprising a first terminal and a second terminal, wherein the first resistors (R11-R14) are connected at their first terminal to a voltage source (UH1), and wherein each of the first resistors (R11-R14) is connected at its second terminal to the anode of a respective one of the first diodes (D11-D14) and to the anode of a respective one of the second diodes (D21-D24);
- a plurality of third diodes (D31-D34) each comprising a cathode and an anode, wherein each cathode of the third diodes (D31-D34) is connected to a respective one of the parallel strings (S1-S4) and a respective one of the cathodes of the second diodes (D21-D24); and
- a plurality of second resistors (R21-R24) each comprising a first terminal and a second terminal, wherein the second resistors (R21-R24) are connected at their first terminals to a dimming circuit (18), and wherein each of the second resistors (R21-R24) is connected at its second terminal to the cathode of a respective one of the plurality of second diodes (D21-D24) and to the cathode of a respective one of the plurality of third diodes (D31-D34).

10. A light emitting diode circuit comprising:
- a plurality of parallel strings (S1-S4) comprising one or more light emitting diodes (16) arranged in series;
- a current source (12) configured to receive an input voltage and to provide an operating current to the parallel strings (S1-S4);
- a plurality of first diodes (D11-D14) each comprising a cathode and an anode, wherein the cathodes of the first diodes are connected to one another;
- a plurality of second diodes (D21-D24) each comprising a cathode and an anode, wherein each cathode of the second diodes (D21-D24) is connected to a respective one of the parallel strings (S1-S4);
- a plurality of first resistors (R11-R14) each comprising a first terminal and a second terminal, wherein the first resistors (R11-R14) are connected at their first terminal to a voltage source (UH1), and wherein each of the first resistors (R11-R14) is connected at its second terminal to the anode of a respective one of the first diodes (D11-D14) and to the anode of a respective one of the second diodes (D21-D24);
- a plurality of third diodes (D31-D34) each comprising a cathode and an anode, wherein each cathode of the third diodes (D31-D34) is operatively coupled to a respective one of the parallel strings (S1-S4) and a respective one of the cathodes of the second diodes (D21-D24); and
- a plurality of second resistors (R21-R24) each comprising a first terminal and a second terminal, wherein each of the second resistors (R21-R24) is connected at its second terminal to the cathode of a respective one of the plurality of second diodes (D21-D24) and to the cathode of a respective one of the plurality of third diodes (D31-D34).

11. The light emitting diode circuit of claim 10 further comprising:
- a dimming circuit (18), wherein the second resistors (R21-R24) are connected at their first terminals to the dimming circuit (18).

12. The light emitting diode circuit of claim 10 further comprising:

an excess voltage protection circuit (20) including a Zener diode (ZD1) electrically coupled to the current source and the parallel strings (S1-S4).

13. The light emitting diode circuit of claim 10 further comprising:
a voltage divider series circuit comprising a first, a second and a third voltage divider resistor (RT1, RT2, RT3);
wherein a first terminal of the voltage divider series circuit associated with the first voltage divider resistor (RT1) is connected to the voltage source (UH1) and wherein a second terminal of the voltage divider series circuit associated with the third voltage divider resistor (RT3) is connected to a reference potential;
wherein a connection between the second and the third voltage divider resistors (RT2, RT3) is connected to the cathodes of the first diodes (D11-D14) at a first control voltage reference node (KP1); and
wherein a connection between the first and the second voltage divider resistors (RT1, RT2) is connected to an excess voltage protection circuit (20) at a second control voltage reference node (KP2).

14. A light emitting diode circuit comprising:
a plurality of parallel strings (S1-S4) of one or more light emitting diodes (16) arranged in series;
a current source (12) configured to receive an input voltage and to provide an operating current to the parallel strings (S1-S4);
a plurality of first diodes (D21-D24) each comprising a cathode and an anode, wherein each cathode of the first diodes (D21-D24) is connected to a respective one of the parallel strings (S1-S4);
a plurality of second diodes (D31-D34) each comprising a cathode and an anode, wherein each cathode of the second diodes (D31-D34) is connected to a respective one of the parallel strings (S1-S4) and a respective one of the cathodes of the first diodes (D21-D24);
a plurality of first resistors (R11-R14) each comprising a first terminal and a second terminal, wherein the first resistors (R11-R14) are connected to a voltage source (UH1), and wherein each of the first resistors (R11-R14) is connected at its second terminal to the anode of a respective one of the first diodes (D21-D24);
a voltage divider series circuit comprising a first, a second and a third voltage divider resistor (RT1, RT2, RT3);
a plurality of third diodes (D11-D14) each comprising a cathode and an anode, wherein each cathode of the third diodes (D11-D14) are connected to the voltage divider series circuit; and
a plurality of second resistors (R21-R24) each comprising a first terminal and a second terminal, wherein the second resistors (R21-R24) are operatively coupled at their first terminals to a dimming circuit (18), and wherein each of the second resistors (R21-R24) is connected at its second terminal to the cathode of a respective one of the plurality of second diodes (D21-D24) and to the cathode of a respective one of the plurality of third diodes (D31-D34).

15. The circuit (10) of claim 2, wherein a first terminal of the voltage divider series circuit associated with the first voltage divider resistor (RT1) is connected to the voltage source (UH1) and wherein a second terminal of the voltage divider series circuit associated with the third voltage divider resistor (RT3) is connected to a reference potential.

* * * * *